US012320785B2

(12) United States Patent
Sasaki

(10) Patent No.: US 12,320,785 B2
(45) Date of Patent: Jun. 3, 2025

(54) COLUMN OVEN AND GAS CHROMATOGRAPH

(71) Applicant: Shimadzu Corporation, Kyoto (JP)

(72) Inventor: Kasumi Sasaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 415 days.

(21) Appl. No.: 17/977,109

(22) Filed: Oct. 31, 2022

(65) Prior Publication Data

US 2023/0194481 A1    Jun. 22, 2023

(30) Foreign Application Priority Data

Dec. 20, 2021    (JP) .................. 2021-205883

(51) Int. Cl.
*B01D 53/22*    (2006.01)
*G01N 30/30*    (2006.01)

(52) U.S. Cl.
CPC ..... *G01N 30/30* (2013.01); *G01N 2030/3084* (2013.01)

(58) Field of Classification Search
CPC .................. G01N 30/30; G01N 2030/3084
See application file for complete search history.

(56) References Cited

U.S. PATENT DOCUMENTS

| | | | | | |
|---|---|---|---|---|---|
| 3,414,704 | A | * | 12/1968 | Flanagan | ................. H05B 1/02 219/241 |
| 4,992,223 | A | * | 2/1991 | Nelson | ............... B29C 44/1247 29/460 |
| 5,052,347 | A | * | 10/1991 | Nelson | .................... F24H 1/182 122/494 |
| 5,208,964 | A | * | 5/1993 | Nelson | ............... B29C 44/1247 29/460 |
| 5,229,048 | A | * | 7/1993 | Nelson | .................... F24H 1/182 29/460 |
| 5,348,229 | A | * | 9/1994 | Wood | .................... F02M 53/04 239/397.5 |
| 6,148,774 | A | * | 11/2000 | Neill | ....................... F24H 1/182 220/592.25 |
| 6,280,316 | B1 | * | 8/2001 | Loup | .................. B60H 1/00521 454/158 |
| 6,572,723 | B1 | * | 6/2003 | Tilton | ..................... F16L 59/00 264/327 |
| 10,018,463 | B1 | * | 7/2018 | Hubble | ................ G01B 11/167 |
| 2016/0333571 | A1 | * | 11/2016 | Juranitch | ................ C03B 3/023 |
| 2017/0282096 | A1 | * | 10/2017 | Bouvier | ................ B01D 15/20 |

(Continued)

*Primary Examiner* — Anthony R Shumate
(74) *Attorney, Agent, or Firm* — Muir Patent Law, PLLC

(57) ABSTRACT

A column oven is provided with an inner casing forming an inner space therein, the inner space being configured to adjust a temperature of a separation column for gas chromatography in a state in which the separation column is accommodated in the inner space, a temperature control element provided in the inner space to adjust the temperature of the inner space, and a heat insulation material layer surrounding an outer peripheral surface of the inner casing, the heat insulation material being composed of a fibrous material. The heat insulation material layer includes a first layer having a first bulk density $\rho_1$ and a second layer enclosing an outer side of the first layer, the second layer having a second bulk density $\rho_2$ smaller than the first bulk density $\rho_1$.

3 Claims, 1 Drawing Sheet

(56) References Cited

U.S. PATENT DOCUMENTS

| | | | |
|---|---|---|---|
| 2018/0223441 A1* | 8/2018 | Proshkin | C25C 3/085 |
| 2018/0237926 A1* | 8/2018 | Proshkin | C25C 3/06 |
| 2019/0092676 A1* | 3/2019 | Otter | C03B 20/00 |
| 2020/0308359 A1* | 10/2020 | Glenn | C08J 9/0085 |
| 2022/0235842 A1* | 7/2022 | Matsui | F16L 55/0335 |

* cited by examiner

COLUMN OVEN AND GAS CHROMATOGRAPH

CROSS-REFERENCE TO RELATED APPLICATIONS

This application claims priority under 35 U.S.C. § 119 to Japanese Patent Application No. 2021-205883 filed on Dec. 20, 2021, the entire disclosure of which is incorporated herein by reference in its entirety.

BACKGROUND OF THE INVENTION

Field of the Invention

The present invention relates to a column oven and a gas chromatograph provided with the column oven.

Description of Related Art

The following description sets forth the inventor's knowledge of related art and problems therein and should not be construed as an admission of knowledge in the prior art.

In a gas chromatograph, it is common to control a temperature of a separation column for separating components of a sample gas to a set temperature by raising or lowering the temperature in the column oven in a state in which the separation column is accommodated in the column oven. The column oven is configured such that an inner space for accommodating the separation column is surrounded by a heat insulation material to thermally block the inner space from the outside (see Patent Document 1).

PRIOR ART DOCUMENT

Patent Document

Patent Document 1: Japanese Unexamined Patent Application Publication No. 2018-162972

SUMMARY OF THE INVENTION

In order to control the temperature in the column oven with high accuracy, it is important to increase the heat insulation performance of the inner space of the column oven. Generally, increasing the volume of the heat insulation material improves the heat insulation performance. Therefore, by increasing the volume of the heat insulation material surrounding the inner space of the column oven, the heat insulation performance of the inner space can be enhanced. However, by doing so, the heat capacity of the heat insulation material increases, which makes the time required for naturally cooling the heat insulation material longer in a case where it is desired to lower the temperature in the column oven.

The preferred embodiments of the present invention have been developed in view of the above-mentioned and/or other problems in the related art. The preferred embodiments of the present invention can significantly improve upon existing methods and/or apparatuses.

The present invention aims to improve the cooling efficiency of an inner space of a column oven while ensuring a heat insulation performance of the inner space.

Means for Solving the Problem

A thermal conductivity λ [W/(m·K)] of a heat insulation material can be approximated by a thermal conductivity of a solid, a thermal conductivity to which radiation contributes, and a thermal conductivity of a gas (see Takahiro OMURA et al., Report of the Institute of Functional Materials Research, Kyushu University, Volume 16, p 13-17, 2002, Study on Effective Thermal Conductivity of Fibrous Heat Insulation Material). That is, a thermal conductivity λ of a heat insulation material can be expressed by the following Equation (1).

$$\lambda = A\rho + (B/\rho)T^3 + C \quad (1)$$

where A, B, and C are coefficients obtained from experiments, $\rho$ is a bulk density [Kg/m³] of a heat insulation material, and T is an absolute temperature [K].

The first term on the right-hand side of the Equation is a thermal conductivity of a solid, the second term is a thermal conductivity to which radiation contributes, and the third term is a thermal conductivity of a gas. From the above-described Equation (1), it can be seen that, in the high-temperature range (for example, 300° C. or higher), the contribution of the thermal conductivity due to radiation is large, and the thermal conductivity due to radiation becomes smaller as the bulk density of the heat insulation material becomes larger. That is, the larger the bulk density of the heat insulation material, the higher the thermal insulation performance in the high-temperature range. Conversely, the contribution of the bulk density $\rho$ to the thermal conductivity increases in the low-temperature range.

Further, the heat quantity Q[J] accumulated in an object can be expressed by the following Equation (2) according to the law of conservation of heat.

$$Q = \rho V c \Delta T \quad (2)$$

where V is a volume [m³] of a heat insulation material, and c is a specific heat [J/kg·K].

From this Equation (2), as compared with a heat insulation material having the same volume, it can be seen that the smaller the bulk density of a heat insulation material, the smaller the amount of heat accumulated, i.e., the heat capacity.

The present invention utilizes the above facts to attain the improvement of the thermal insulation performance and the improvement of the cooling efficiency in a column oven.

That is, a column oven according to the present invention is provided with:
- an inner casing forming an inner space therein, the inner space being configured to adjust a temperature of a separation column for gas chromatography in a state in which the separation column is accommodated in the inner space, and;
- a temperature control element provided in the inner space to adjust a temperature of the inner space; and
- a heat insulation material layer surrounding an outer peripheral surface of the inner casing, the heat insulation material being composed of a fibrous material,
- wherein the heat insulation material layer includes a first layer having a first bulk density and a second layer enclosing an outer side of the first layer, the second layer having a second bulk density smaller than the first bulk density.

A gas chromatograph according to the present invention is provided with:
- a sample vaporization unit provided with a sample inlet port, the sample vaporization unit being configured to generate a sample gas by vaporizing a sample injected from the sample inlet port;
- a separation column provided with an inlet and an outlet, the inlet being fluidly connected to the sample vaporization unit, the separation column being configured to separate components in the sample gas generated by the sample vaporization unit;

a detector connected to the outlet of the separation column to detect the components separated by the separation column; and the column oven of the present invention, the column oven having an inner space configured to adjust the temperature of the separation column in a state in which the separation column is accommodated.

Effects of the Invention

In the column oven according to the present invention, in a high-temperature area close to the inner casing, the heat caused by radiation from the inner casing is effectively blocked by the first layer having a large bulk density (first bulk density), while in a relatively low-temperature area located outer than the first layer, an increase in the heat capacity is suppressed by securing a high thermal insulation performance by a large volume of the heat insulation material layer by arranging a second layer having a small bulk density (second bulk density). With this, it is possible to improve the cooling efficiency of the inner space of the column oven while securing the heat insulation performance of the inner space.

In the gas chromatograph according to the present invention, the column oven according to the above-described present invention is used. For this reason, the time required for raising and lowering the temperature of the separation column can be shortened, which in turn can improve the analysis effectiveness.

BRIEF DESCRIPTION OF THE DRAWINGS

Preferred embodiments of the present invention are shown by way of example, and not limitation, in the accompanying figures.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those skilled in the art based on these illustrated embodiments.

Hereinafter, one example of a column oven and a gas chromatograph according to the present invention will be described with reference to the drawings.

Figure 1:
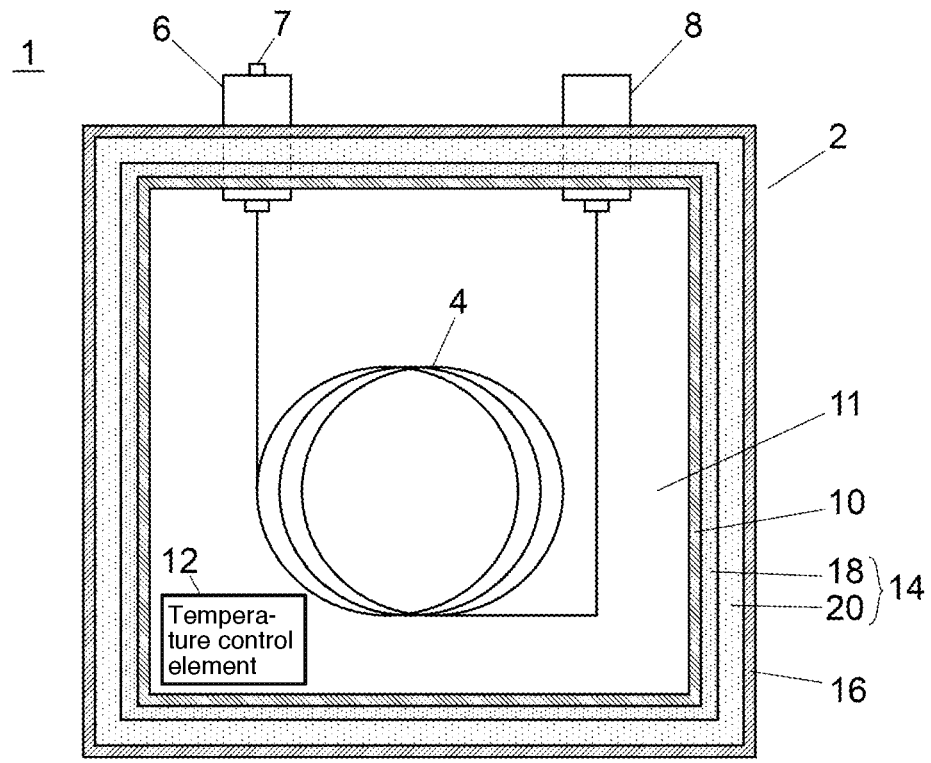
FIG. 1 is a schematic configuration cross-sectional diagram showing one example of a gas chromatograph.

FIG. 1 schematically shows a structure of a gas chromatograph 1.

The gas chromatograph 1 is provided with a column oven 2, a separation column 4, a sample vaporization unit 6, and a detector 8. The separation column 4 is accommodated in the inner space 11 of the column oven 2. In the inner space 11 of the column oven 2, a temperature control element 12 for adjusting the temperature of the inner space 11 is provided. The temperature control element 12 includes, for example, a heater, a Peltier device, and a fan.

The sample vaporization unit 6 and the detector 8 are attached to the upper portion of the column oven 2. The separation column 4 has one end as an inlet and the other end as an outlet. The inlet is connected to the sample vaporization unit 6, and the outlet is connected to the detector 8. The sample vaporization unit 6 is provided with a sample inlet port 7 at an upper portion thereof and is configured to vaporize the sample injected via the sample inlet port 7 to thereby generate a sample gas. The sample gas generated in the sample vaporization unit 6 is introduced into the separation column 4, and the components in the sample gas are separated from each other. The detector 8 detects the components separated from each other in the separation column 4.

The column oven 2 is provided with an inner casing 10 forming an inner space 11 on the inner side, a heat insulation material layer 14 surrounding the outer peripheral surface of the inner casing 10, and an outer casing 16 further surrounding the outer side of the heat insulation material layer 14. That is, the wall of the column oven 2 is constituted by the inner casing 10, the heat insulation material layer 14, and the outer casing 16 from the inside (see FIG. 2). The wall of the ceiling portion of the column oven 2 is provided with through-holes for allowing the sample vaporization unit 6 and the detector 8 to pass therethrough. Each of the sample vaporization unit 6 and the detector 8 is secured to the outer casing 16 in a state of penetrating the roof portion of the column oven 2.

The heat insulation material layer 14 interposed between the inner casing 10 and the outer casing 16 of the column oven 2 is formed of a fibrous material, such as, e.g., glass wool or rock wool. The heat insulation material layer 14 includes a first layer 18 and a second layer 20. The first layer 18 covers the outer peripheral surface of the inner casing 10, and the second layer 20 covers the outer peripheral surface of the first layer 18.

Figure 2:
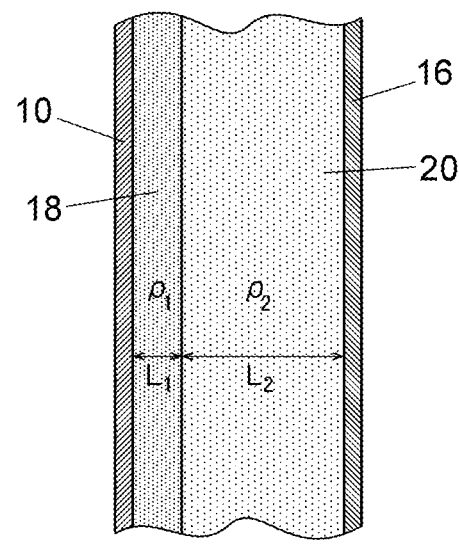
FIG. 2 is a cross-sectional diagram for explaining a structure of a heat insulation material layer of a column oven of the example.

The wall inner side cross-section of the column oven 2 is shown in FIG. 2.

The first layer 18 of the heat insulation material layer 14 is located in an area close to the inner casing 10. This area is an area that reaches a high temperature when the temperature of the separation column 4 is raised to a high temperature (for example, 300° C. or higher). On the other hand, the second layer 20 of the heat insulation material layer 14 is located in an area away from the inner casing 10. This area is an area lower in temperature as compared with the area where the first layer 18 is located because the first layer 18 interposed between the first layer 18 and the inner casing 10.

The first layer 18 and the second layer 20 have mutually different bulk densities $\rho_1$ and $\rho_2$. The bulk density $\rho_1$ of the first layer 18 is larger than the bulk density $\rho_2$ of the second layer 20. For instance, the bulk density $\rho_1$ of the first layer 18 is more than twice the bulk density $\rho_2$ of the second layer 20. The thickness $L_2$ of the second layer 20 is larger than the thickness $L_1$ of the first layer. For example, the thickness $L_2$ of the second layer 20 is at least twice the thickness $L_1$ of the first layer.

As described above, in the high-temperature range (for example, 300° C. or higher), the contribution of thermal conduction due to radiation is large, and as the bulk density of the heat insulation material becomes large, the thermal conductivity due to radiation becomes small. Therefore, if it is aimed only to enhance the heat insulation performance of the inner space 11, it is sufficient to cover the outer peripheral surface of the inner casing 10 with a heat insulation material layer of a large thickness having a large bulk density. In other words, it is sufficient to form the heat insulation material layer 14 only by the first layer 18 having a large bulk density. In this case, however, the heat capacity of the heat insulation material layer 14 increases, which takes a long time to cool the inner space 11.

In this example, the first layer 18 having a large bulk density $\rho_1$ is arranged only in an area that reaches a high temperature, and the second layer 20 having a relatively low bulk density $\rho_2$ is arranged in a relatively low-temperature area on the outer side thereof. In the low-temperature area, the contribution of heat conduction due to radiation is smaller than in the high-temperature area. Therefore, even if the bulk density $\rho_2$ of the heat insulation material layer (second layer 20) arranged in the low-temperature area is lowered than the bulk density $\rho_1$ of the heat insulation material layer (first layer 18) arranged in the high-temperature area, a satisfactory heat insulation effect can be obtained by ensuring a certain thickness $L_2$ of the second layer 20 (for example, twice or more of $L_1$). The second layer 20 is low in heat capacity because of the small bulk density $\rho_2$, and therefore, the heat capacity of the entire heat insulation material layer 14 can be reduced. In particular, by designing such that the second layer 20 occupies most (e.g., 60% or more) of the volume of the heat insulation material layer 14, it is possible to realize the heat insulation material layer 14 having a high thermal insulation performance and a small heat capacity.

Note that the heat insulation material layer 14 is not necessarily required to completely cover the outer peripheral surface of the inner casing 10, and a part of the outer peripheral surface of the inner casing 10 may not be covered by the heat insulation material layer 14. Further, a fabric, a foil, or the like may be interposed between the outer peripheral surface of the inner casing 10 and the first layer 18, between the first layer 18 and the second layer 20, and/or between the second layer 20 and the outer casing 16.

The example described above is only an example of the column oven and the gas chromatograph according to the present invention. It will be understood by those skilled in the art that the above-described exemplary embodiment is a concrete example of the following aspects.

According to one embodiment of the column over according to the present invention, a column oven is provided with:
an inner casing forming an inner space therein, the inner space being configured to adjust a temperature of a separation column for gas chromatography in a state in which the separation column is accommodated in the inner space, and;
a temperature control element provided in the inner space to adjust a temperature of the inner space; and
a heat insulation material layer surrounding an outer peripheral surface of the inner casing, the heat insulation material being composed of a fibrous material,
wherein the heat insulation material layer includes a first layer having a first bulk density and a second layer enclosing an outer side of the first layer, the second layer having a second bulk density smaller than the first bulk density.

According to the above-described embodiment, the second layer of the heat insulation material layer may have a thickness greater than that of the first layer. The second layer is arranged in a lower temperature area than the first layer, and therefore, it is possible to obtain an enough heat insulation effect by securing the thickness of the second layer to some extent. Increasing the thickness of the second layer increases the volume of the entire heat insulation material layer, but the bulk density of the second layer is smaller than the bulk density of the first layer. Therefore, it is possible to suppress the increase in heat capacity of the entire heat insulation material layer, thereby reducing the time required to cool the inner space of the column oven.

According to an embodiment of the gas chromatograph according to the present invention, a gas chromatograph is provided with:
a sample vaporization unit provided with a sample inlet port, the sample vaporization unit being configured to generate a sample gas by vaporizing a sample injected from the sample inlet port;
a separation column provided with an inlet and an outlet, the inlet being fluidly connected to the sample vaporization unit, the separation column being configured to separate components in the sample gas generated by the sample vaporization unit;
a detector connected to the outlet of the separation column to detect the components separated by the separation column; and
the column oven of the present invention, the column oven having an inner space configured to adjust the temperature of the separation column in a state in which the separation column is accommodated.

It should be understood that the terms and phrases used herein are for the purpose of description and not of limitation, and do not exclude any equivalents of the features shown and described herein, and are intended to allow various modifications within the scope of the present invention claim.

DESCRIPTION OF SYMBOLS

1: Gas chromatograph
2: Column oven
4: Separation column
6: Sample vaporization unit
8: Detector
10: Inner casing
12: Temperature control element
14: Heat insulation material layer
16: Outer casing
18: First layer
20: Second layer

The invention claimed is:
1. A column oven comprising:
an inner casing forming an inner space therein, the inner space being configured to adjust a temperature of a separation column for gas chromatography in a state in which the separation column is accommodated in the inner space, and;
a temperature control element provided in the inner space to adjust a temperature of the inner space; and
a heat insulation material layer surrounding an outer peripheral surface of the inner casing, the heat insulation material being composed of a fibrous material,
wherein the heat insulation material layer includes a first layer having a first bulk density and a second layer enclosing an outer side of the first layer, the second layer having a second bulk density smaller than the first bulk density.
2. The column oven as recited in claim 1,
wherein the second layer of the heat insulation material layer has a thickness greater than that of the first layer.
3. A gas chromatograph comprising:
a sample vaporization unit provided with a sample inlet port, the sample vaporization unit being configured to generate a sample gas by vaporizing a sample injected from the sample inlet port;

a separation column provided with an inlet and an outlet, the inlet being fluidly connected to the sample vaporization unit, the separation column being configured to separate components in the sample gas generated by the sample vaporization unit;

a detector connected to the outlet of the separation column to detect the components separated by the separation column; and the column oven recited in claim 1, the column oven having an inner space configured to adjust the temperature of the separation column in a state in which the separation column is accommodated.

\* \* \* \* \*